Feb. 13, 1934.  B. G. GOBLE  1,947,198
FLOATING STUFFING BOX
Filed Feb. 10, 1930  3 Sheets—Sheet 1

Inventor
BERT G. GOBLE.
By Tom J. Boman.
Attorney

Feb. 13, 1934.  B. G. GOBLE  1,947,198
FLOATING STUFFING BOX
Filed Feb. 10, 1930  3 Sheets-Sheet 2

Inventor
BERT G. GOBLE.
By Tom S. Boman.
Attorney

Feb. 13, 1934.  B. G. GOBLE  1,947,198
FLOATING STUFFING BOX
Filed Feb. 10, 1930   3 Sheets-Sheet 3
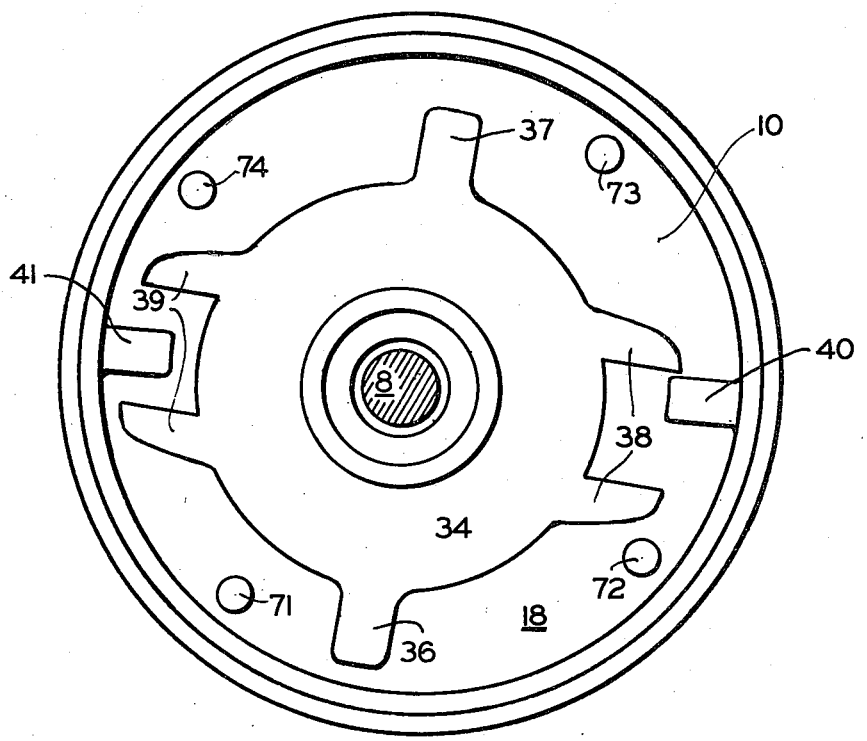
Inventor
BERT G. GOBLE
By
Tom B. Boman.
Attorney Patented Feb. 13, 1934

1,947,198

UNITED STATES PATENT OFFICE 1,947,198

FLOATING STUFFING BOX

Bert G. Goble, Tulsa, Okla., assignor to W. A. Quigley

Application February 10, 1930. Serial No. 427,236

8 Claims. (Cl. 286—16)

This invention relates to a stuffing box and more definitely to a floating stuffing box suitable for oil wells. A floating stuffing box is a great help in eliminating loss of oil, wear, attention, power and trouble of different kinds, if made so that the polish rod can move laterally the full distance allowed by the size of the tubing.

One disadvantage of present day floating stuffing boxes, as used in the oil fields, is that the floating element does not move easily enough or far enough and hence the polish rod is bent out of its straight line position and thus excessive wear is occasioned by lack of proper lubrication and freedom of movement. In my novel stuffing box I provide for proper lubrication, in fact, I provide lubrication on both sides of the rubbing parts and furthermore all rubbing or contacting parts are fully covered with a bath of oil.

Another feature of my device is that I use a perfect two point ball bearing on the floating portion of my stuffing box so that practically the only friction in the floating portion is on the packing, and that is lubricated from the inside and also from the outside by a bath of oil or other lubricant best suited for sealing off the pressure of oil in the tubing.

Another advantage of my stuffing box is that the packing rings for the polish rod have a rainproof roof over the oil chamber. This is quite an improvement over the old type of open box, as the open type catches so much rain that the water floats the oil out. Thus lubrication is lacking and the packing burns itself out.

Another important object of my invention is that the rubbing parts which move horizontally are thoroughly incased and run in a bath of oil or other suitable lubricant and by being so incased the lubricant fills up over the top portion of these rubbing parts that hold the floating portion down on the packing ring. The same thing is true of the chamber above with relation to the packing rings engaged in the packing of the polish rod.

Another important feature of my improved stuffing box is that the horizontal parts are so incased from the elements as to preserve the fluid therein from dilution. Hence, a fluid capable of both sealing off the pressure from the inside of the tubing and lubricating these rubbing parts may be expediently used. All parts are thoroughly covered with the fluid, and the sliding portion moves out into this fluid during each stroke, dragging some of the fluid with it so that the packing is thoroughly lubricated.

Another feature of my device is the sediment chamber which catches or holds any water, foreign particles or cuttings which may settle out of the oil. This allows the wearing parts to always be free from any heavy substances, such as grit, that might be detrimental in wearing or tearing the packing in its horizontal movement.

Another feature of my device is the style of sediment basin. It is constructed so that if fresh water accumulates in it, freezing will not burst it. The top is all open, the sides are tapered and the bottom is rounded so that ice can expand upwardly and not break the sides. This basin has a drain plug at its lowest place.

Another feature which I regard as part of my invention, is the packing ring. This ring rides in a dovetailed groove in the main body member and is forced tightly therein. The ring is preferably of rubber composition and has lead inserts therein. These prevent excessive distortion of the ring and also render it more adaptable to receive the sliding part by reducing the coefficient of friction therebetween.

It will be noted than an adjustable roof is provided for the main reservoir. Oil may be placed in this reservoir by means of my novel inlet duct. This duct does not have a plug and yet it will prevent rain and the like from entering the oil reservoir. It requires no threading and is formed by inventively forming three holes. Its operation will be set forth later in the specification.

The main reservoir provides lubrication for the ball race and the packing ring. The packing ring is also lubricated by oil thrown up through the well tubing.

The floating member receives packing in the usual manner and a left hand spring bears thereon. The follower may be adjusted up and down on a right hand thread and hence little friction is developed between the stationary spring and the revolving follower when the same is traveling downwardly as what little friction is developed tends to compress the spring. This makes for ease of adjustment.

The follower is also provided with an inclosed reservoir which not only keeps the polish rod thoroughly oiled but also provides a supply of oil for the inner side of the packing ring. This occurs by oil seeping downwardly along the rod and then towards the packing ring.

Another feature of my invention is that the tension springs are entirely incased, work in a bath of oil, and prevent rust.

There are other minor features of invention, involving special features of elemental construction, as will hereinafter appear.

In the drawings chosen for the purpose of illustrating my invention, the scope whereof is pointed out in the claims, Figure 1 is a cross sectional view of the preferred form of my invention.

Figure 5 is a reduced top view of the follower.

Figure 6 is a view in section taken along the line VI—VI of Figure 1.

Figure 7 is a schematic view showing one of the many positions of my compressible pad which the floating parts may assume relative to their support.

Similar numerals designate similar parts throughout the several views.

Numeral 9 designates the usual well tubing or casing which has the ordinary polish rod 8 therein. This rod is reciprocated in any suitable manner.

Figure 1:
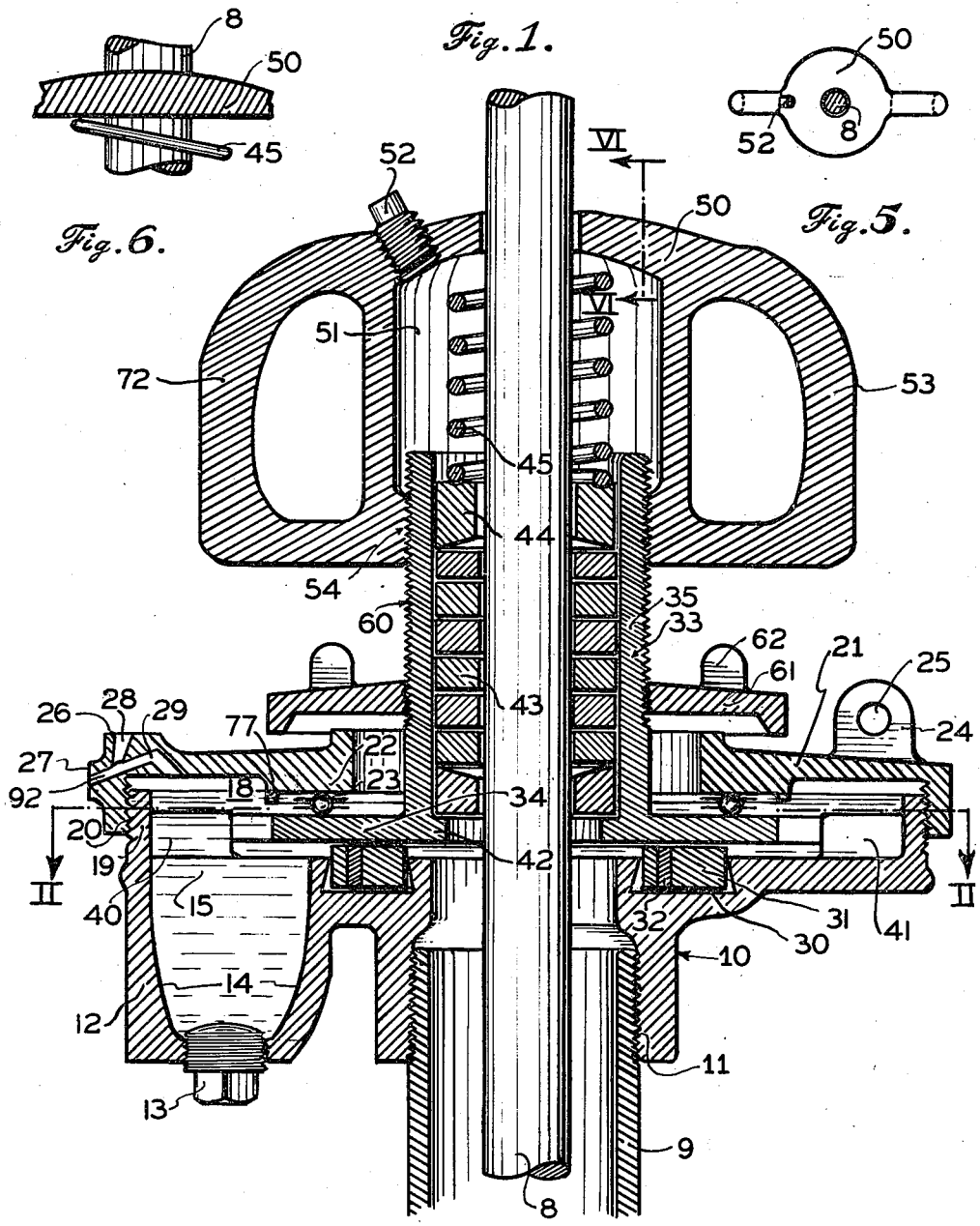
Figures 3, 4:
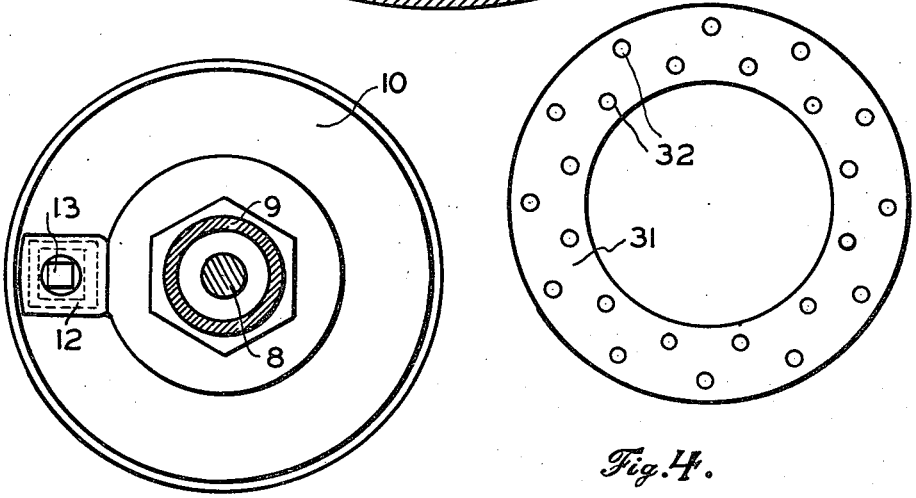
Figure 3 is a bottom view showing the position of the sediment chamber.
Figure 4 is a plan view of the packing ring showing the positioning of the lead inserts.

The well tubing casing has threads 11 and a cylindrical body member 10, having a drainage basin or sediment chamber 12 cast integrally therewith, is screwed thereon. A plug 13, see Figures 1 and 3, provides for draining the chamber. The chamber is tapered as shown at 14 and any ice forming therein tends to creep upwardly thus precluding any breakage of the walls. The top part of this sediment chamber opens into the main reservoir as shown at 15.

The main reservoir 18 is formed by the circular flange 19. A cover plate 21 is fastened to the flange 19 as at 20 and has a downwardly extending portion 22 adapted to abut the ball bearing 23. Also, a lug 24, having a hole 25, provides a place for attaching a handle. (Not shown). The cover plate 21 is thickened to form a horizontal boss 26 and a vertical boss 27 as clearly shown in Figure 1. A feeding duct or passageway 28 provides for ingress or pouring in of the oil. This is done by holding one's finger over the duct or hole 92, issuing in the vertical boss 27 and then pouring oil into the top part of the duct or passageway 28. Pressure then forces the oil along the feeding duct 29 into the main reservoir 18. Rain cannot enter the oil chamber due to the inclination of the passageway.

The body member 10 has a dovetailed groove 30 adapted to receive the packing ring 31. This ring is flat and is provided with a series of lead inserts 32. The ring is formed of any suitable packing material and the lead may be forced into holes as shown in Figures 1 and 4.

The floating member 33 rests upon the ring, 31 and may be forced down upon the same by rotation of the cover plate in the proper direction. This causes the ball bearing 23 to forcibly engage the floating member and properly seat it against the packing ring thereby preventing leakage of the oil from the well casing and yet permitting the floating member and its contained packing to align itself with the line of reciprocation of the polish rod. It will be noted that anti-friction members are placed on both sides of the floating member 33 and that both anti-friction members are thoroughly lubricated due to my arrangement of parts.

Figure 2:
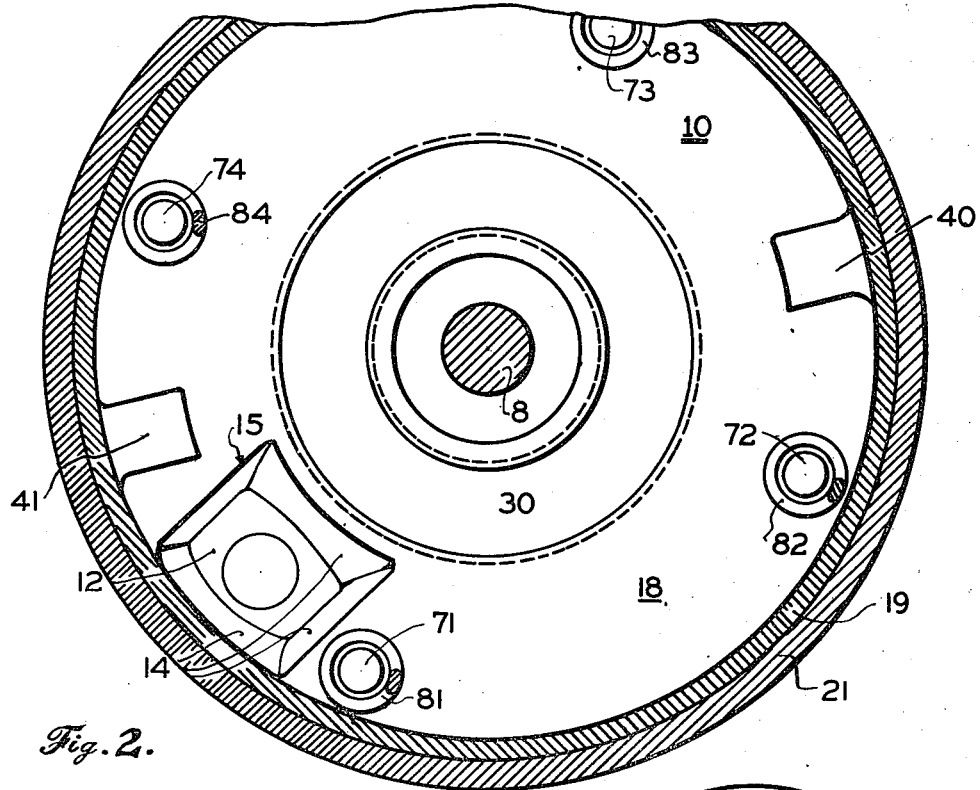
Figure 2 is a view taken along line II—II of Figure 1, the floating parts being omitted.

The floating member 33 has a bottom plate portion 34 and a cylindrical top portion 35. The plate portion has two radial extending lugs 36 and 37 which prevent excessive movement of the polish rod in a lateral direction. Lugs 38 and 39 also serve this function as well as preventing rotation of the floating member 33. Lugs 38 and 39 straddle bosses 40 and 41 as shown in Figure 2. Thus the follower 50 may be tightened to its proper position without any additional manipulation.

The body member 10 also has four small bosses 71, 72, 73 and 74 adapted to hold the springs 81, 82, 83 and 84, respectively, between the body member 10 and the cover plate member 21. See Figures 2 and 7.

A ledge 42 provides a seat for the usual packing 43 and a left hand helical spring 45 bears down upon the follower.

The follower 50 is recessed to form a lubricant chamber 51 closed by a plug 52. Suitable handles 72 and 53 are integrally cast with the follower 50 and threads 54 engage the threads 60 on the top portion of the floating member.

A roof member 61 is also threadedly engaged along the threads 60 and the lugs 62 serve as handle means to adjust it as well as providing holding means during the manufacturing operations.

Having thus described my invention I desire it to be understood that the invention is in no wise limited to the particular illustrative embodiment disclosed, the scope thereof being set forth in the following claims.

What I claim is:—

1. A floating stuffing box comprising a body member having a threaded opening adapted to be screwed onto tubing, said body member having a groove concentric about the threaded opening, a packing ring in said groove, a circular exteriorly threaded flange formed integrally with the body member, a threaded cover plate adapted to be screwed onto the aforesaid threaded flange in adjustable relationship thereto, a stuffing box member having a radially extending bottom plate portion adapted to slidably rest upon the packing ring and anti-friction means inserted between the cover plate and the radial extending bottom plate portion.

2. A stuffing box as set forth in claim 1 but further characterized by the fact that the body member has an upwardly extending lug and that the bottom plate portion has a slot adapted to receive the lug.

3. A device as per claim 1 in which said cover plate has an opening adapted to receive the stuffing box therethrough, and a roof on the stuffing box extending over the opening in the cover plate.

4. In a reservoir the combination of a member forming a wall therefor, said member having a substantially horizontal surface and a substantially vertical surface on its outside, said member having an upwardly inclined passageway from its vertical surface and joining to a downwardly inclined passageway leading to the inside of the member, said member also having a passageway of upward inclination leading from the first mentioned passageway to the horizontal surface.

5. An oiling system comprising a member having three interconnected ducts therein, one duct being the feeding duct and having its open end above either of the open ends of the other ducts, one of these last mentioned ducts being the entering duct, said entering duct having some part along its length at a greater elevation than the point of interconnection between the three ducts.

6. A floating stuffing box structure comprising a cylindrical body member having a central opening, said body member also having a groove circumposed thereabout, packing in the groove, an upwardly extending circular flange on the body member, a stuffing box adapted to slide upon the packing and means including anti-friction means adapted to hold the stuffing box against the packing.

7. In combination, a body member having an opening adapted to be fastened to a well tubing of an oil well, a floating stuffing box having a polish rod receiving opening located about centrally over the opening in the body member, means to mount the stuffing box upon said body member in slidable engagement therewith and a sediment chamber connected onto the bottom of said body member.

8. A combination of elements as set forth in claim 7 in which said sediment chamber has its side walls tapered and its inner bottom corners rounded to allow ice forming therein to expand upwardly.

BERT G. GOBLE.